US007703017B2

(12) United States Patent
Mise et al.

(10) Patent No.: US 7,703,017 B2
(45) Date of Patent: Apr. 20, 2010

(54) PROGRAM DISPLAY METHOD, PROGRAM DISPLAY APPARATUS, AND PROGRAM DELIVERY AND DISPLAY SYSTEM

(75) Inventors: Hiroaki Mise, Tokyo (JP); Toshiyuki Amaya, Saitama (JP); Makoto Takanashi, Tokyo (JP); Kazuhiro Miyamoto, Tokyo (JP); Shigeki Yatabe, Tokyo (JP)

(73) Assignee: Pioneer Corporation, Tokyo (JP)

( * ) Notice: Subject to any disclaimer, the term of this patent is extended or adjusted under 35 U.S.C. 154(b) by 290 days.

(21) Appl. No.: 11/028,668

(22) Filed: Jan. 5, 2005

(65) Prior Publication Data

US 2005/0166142 A1 Jul. 28, 2005

(30) Foreign Application Priority Data

Jan. 9, 2004 (JP) ............................ 2004-004752

(51) Int. Cl.
*G06F 17/00* (2006.01)
*G06F 3/00* (2006.01)
*G06F 3/048* (2006.01)
*G06F 17/30* (2006.01)

(52) U.S. Cl. ....................... 715/730; 715/201; 715/202; 715/716; 715/810; 725/42; 705/27

(58) Field of Classification Search ................. 715/517, 715/522, 526, 716, 730, 500.1; 725/42; 705/27
See application file for complete search history.

(56) References Cited

U.S. PATENT DOCUMENTS 6,038,545 A * 3/2000 Mandeberg et al. ........... 705/15
6,081,262 A * 6/2000 Gill et al. ................. 715/500.1
6,161,114 A * 12/2000 King et al. .................. 715/517
6,240,555 B1 * 5/2001 Shoff et al. ................. 725/110
6,405,221 B1 * 6/2002 Levine et al. ............ 715/501.1
6,658,464 B2 * 12/2003 Reisman ..................... 709/219
6,826,727 B1 * 11/2004 Mohr et al. ................. 715/517
6,928,610 B2 * 8/2005 Brintzenhofe et al. ....... 715/517

(Continued)

FOREIGN PATENT DOCUMENTS

JP 2002-016562 (A) 1/2002

(Continued)

OTHER PUBLICATIONS

Kazuo Ishida et al., Development of Multi Template Management System for Multi-channel Contents, Internet Systems Research Laboratories, NEC Corporation, Mar. 12, 2002, pp. 3-205-3-206.

(Continued)

*Primary Examiner*—Tadesse Hailu
*Assistant Examiner*—Nicholas S Ulrich
(74) *Attorney, Agent, or Firm*—Foley & Lardner LLP

(57) ABSTRACT

A template file defines a video material data, a first still picture material data, a second still picture material data and text data, and a display area for each of the material data. A presentation file defines the template file and a correlation between each of the display areas and each material data. Based on the template file and the presentation file, an information display device combines and displays as a program the video material data, the first still picture material data, the second still picture material data, and the text data in their respective display areas.

8 Claims, 10 Drawing Sheets

U.S. PATENT DOCUMENTS

| | | | | |
|---|---|---|---|---|
| 7,028,254 | B2 * | 4/2006 | Xia et al. | 715/513 |
| 7,035,848 | B2 * | 4/2006 | Shapiro et al. | 707/5 |
| 7,039,861 | B2 * | 5/2006 | Yagi | 715/517 |
| 7,051,276 | B1 * | 5/2006 | Mogilevsky et al. | 715/517 |
| 7,496,845 | B2 * | 2/2009 | Deutscher et al. | 715/726 |
| 2001/0001160 | A1 * | 5/2001 | Shoff et al. | 725/51 |
| 2002/0188959 | A1 * | 12/2002 | Piotrowski | 725/112 |
| 2004/0001106 | A1 * | 1/2004 | Deutscher et al. | 345/838 |
| 2004/0015401 | A1 * | 1/2004 | Lee et al. | 705/16 |
| 2004/0064510 | A1 * | 4/2004 | Ooi et al. | 709/205 |
| 2004/0225960 | A1 * | 11/2004 | Parikh et al. | 715/517 |
| 2005/0066047 | A1 | 3/2005 | Miyake et al. | |
| 2005/0097458 | A1 * | 5/2005 | Wilson | 715/517 |

FOREIGN PATENT DOCUMENTS

| | | |
|---|---|---|
| JP | 2002-215519 (A) | 8/2002 |
| JP | 2002-351965 (A) | 12/2002 |
| JP | 2003-87727 (A) | 3/2003 |
| JP | 2003-256711 (A) | 9/2003 |
| JP | 2003-316859 A | 11/2003 |
| JP | 2004-7046 (A) | 1/2004 |
| JP | 2004-7659 (A) | 1/2004 |

OTHER PUBLICATIONS

Makiko Katsura et al., "Development of Synchronized Multimedia Playback System," Technical Report of the Institute of Electronics, Information and Communication Engineers, Oct. 2000, pp. 111-118, vol. 100, No. 352.

Kazuo Ishida et al., Development of Multi-channel Content Authoring Method (2)—Multi Template Management System-, Information Processing Society of Japan SIG Notes, vol. 2002, No. 75, Jul. 26, 2002, pp. 5-12.

* cited by examiner

PROGRAM DISPLAY METHOD, PROGRAM DISPLAY APPARATUS, AND PROGRAM DELIVERY AND DISPLAY SYSTEM

BACKGROUND OF THE INVENTION

1) Field of the Invention

The present invention relates to an information display method, an information display device, and an information delivery and display system that provides information in the form of videos, still pictures, and text.

2) Description of the Related Art

Information delivery and display systems are known in which an information creating device creates information, also referred to as programs, such as a guide to a building and its interiors, various floors of a departmental store and the products available on them, real estate, etc., and provides the created programs to viewers by delivering the programs to information display devices via a network such as the Internet, local area network (LAN), etc. In the conventional information delivery and display system, when the programs are created using the information creating device, a producer has to screen the information to be provided to the viewers program by program, which requires a lot of time and effort.

Japanese Patent Laid-Open Publication No. 2003-316859 discloses an advertisement creating system that includes a sales drawing database, a map database, a sales drawing creating terminal, and a server. In this system, upon receiving a request from the sales drawing creating terminal, the server outputs picture data, floor plan data, layout data of a sales drawing or advertising catalog, and related information. The sales drawing creating terminal creates a sales drawing or an advertising catalog using the data received from the server. The sales drawings and advertising catalogs are then stored in the sales drawing database and made available to user terminals when accessed.

In particular, the information (maps, picture data and floor plan data of the real estate, and related information) and the layout data necessary for creating the sales drawing or advertising catalog of the real estate are stored as databases. When the producer, who in this case is the program creator or creator of the sales drawing/advertising catalog, inputs from the sales drawing creating terminal (i.e., the information creating device) data pertaining to a registration number, name, value, traffic, location, premises, building, limitations, facilities, remarks, main copy, sub-copy, and transaction mode, the server stores the inputted information by correlating them with the registration number. The server retrieves from the map database the map that includes the location and displays the map on the sales drawing creating terminal. If the producer selects the map that is displayed, the selected map is stored by correlating it with the registration number. If the producer selects the layout data from the sales drawing creating device, input information based on the selected layout data is displayed. Using the sales drawing creating device, the producer retrieves the picture data and the floor plan data from the sales drawing database and creates the sales drawing or the advertisement catalog by pasting the picture data and the floor plan data in the spaces of the layout data. The server stores the sales drawing or the advertising catalog with the picture data and the floor plan data on it in the sales drawing database and makes available the sales drawing/advertising catalog stored in the sales drawing database from the user terminal (information display terminal).

In the conventional technology described above, the information necessary for the program (i.e., the sales drawing/advertisement catalog) is stored in the form of a database, and the program is created by retrieving the required information from the database. Consequently, programs can be created easily and cost-effectively. However, while creating a plurality of programs, the process becomes complex, involving inputting program-specific information not present in the database, selecting the layout data, and pasting the information retrieved from the database. In other words, it is costly in terms of effort and time to use the conventional technology for creating a plurality of programs.

Further, in the conventional technology, the program showcasing the finished product, such as the sales drawing or the advertisement catalog with the map, drawing data, and the floor plan data pasted on it, is delivered to the user terminal. As a result, the amount of data for the finished product becomes very large, which results in a delay in delivering the finished product. The amount of data becomes much larger when the program includes video data than when only still picture data is involved, resulting in an inordinate delay in delivering the finished product.

SUMMARY OF THE INVENTION

It is an object of the present invention to at least solve the problems in the conventional technology.

A program display method according to an aspect of the present invention includes combining one or more material data in a single program; and displaying the material data in one or more display areas based on a template file and a presentation file. The template file defines the material data and the display areas to display the material data, and the presentation file defines the template file and a correlation between the display areas and the material data.

An information display device according to another aspect of the present invention includes a data storing unit that stores one or more material data, one or more template files defining one or more display areas for displaying the material data, and one or more presentation files defining the template file and a correlation between the display areas and the material data; a schedule management processing unit that outputs, based on information related to a predetermined display schedule of each program, a playback instruction for playing the presentation file that corresponds to the program to be displayed; a playback processing unit that retrieves from the data storing unit the presentation file corresponding to the playback instruction output by the schedule management processing unit and the template file and the material data defined in the presentation file and that plays the material data in the display areas defined in the template file according to the correlation between the display areas and the material data defined in the retrieved presentation file; and a display unit that displays the material data being played by the playback processing unit in each display area.

An information delivery and display system according to still another aspect of the present invention includes an information creating device that creates a program, the information creating device includes a first data storing unit that stores one or more material data and one or more template files defining one or more display areas for displaying the material data; a presentation creation processing unit that creates a presentation file based on a template file selected from amongst the plurality of template files and a correlation of the one or more display areas and the one or more material data of the selected template file; and a package delivery processing unit that retrieves from the data storing unit the template file and the material data defined in one or more presentation files created by the presentation creation processing unit; a data delivery server that stores the program created by the information creating device, and that receives from the package delivery processing unit a presentation package that includes the template file, the material data, and one or more presentation files; and a program display device that downloads and displays the stored program from the data delivery server, the program display device including a second data storing unit that stores one or more presentation files and the presentation package received from the data delivery server; a schedule management processing unit that outputs, based on information related to a predetermined display schedule of each program, a playback instruction for playing the presentation file that corresponds to the program to be played; a playback processing unit that retrieves from the second data storing unit the presentation file that corresponds to the playback instruction output by the schedule management processing unit and the template file and the material data defined in the presentation file, and that plays the material data in the display areas defined in the template file according to the correlation between the display areas and the material data defined in the retrieved presentation file; and a display unit that displays the material data being played in each display area by the playback processing unit.

The other objects, features, and advantages of the present invention are specifically set forth in or will become apparent from the following detailed description of the invention when read in conjunction with the accompanying drawings.

DETAILED DESCRIPTION

Exemplary embodiments of an information display method, an information display device, and an information delivery and display system are explained below with reference to the accompanying drawings.

An overview of the information display method according to the present invention and its characteristics are explained with reference to FIG. 1 through FIG. 3. Information providing programs (hereinafter, "program"), such as learning materials used in e-learning, real estate guides, building interior guides, etc., generally include a combination of videos, still pictures, and text. The present invention relates to programs that are composed of one or more data of different attributes and to a method by which one or more display areas (windows) are provided in a display screen, each display area displaying information such as video data, still picture data, and/or text data.

Figure 1:
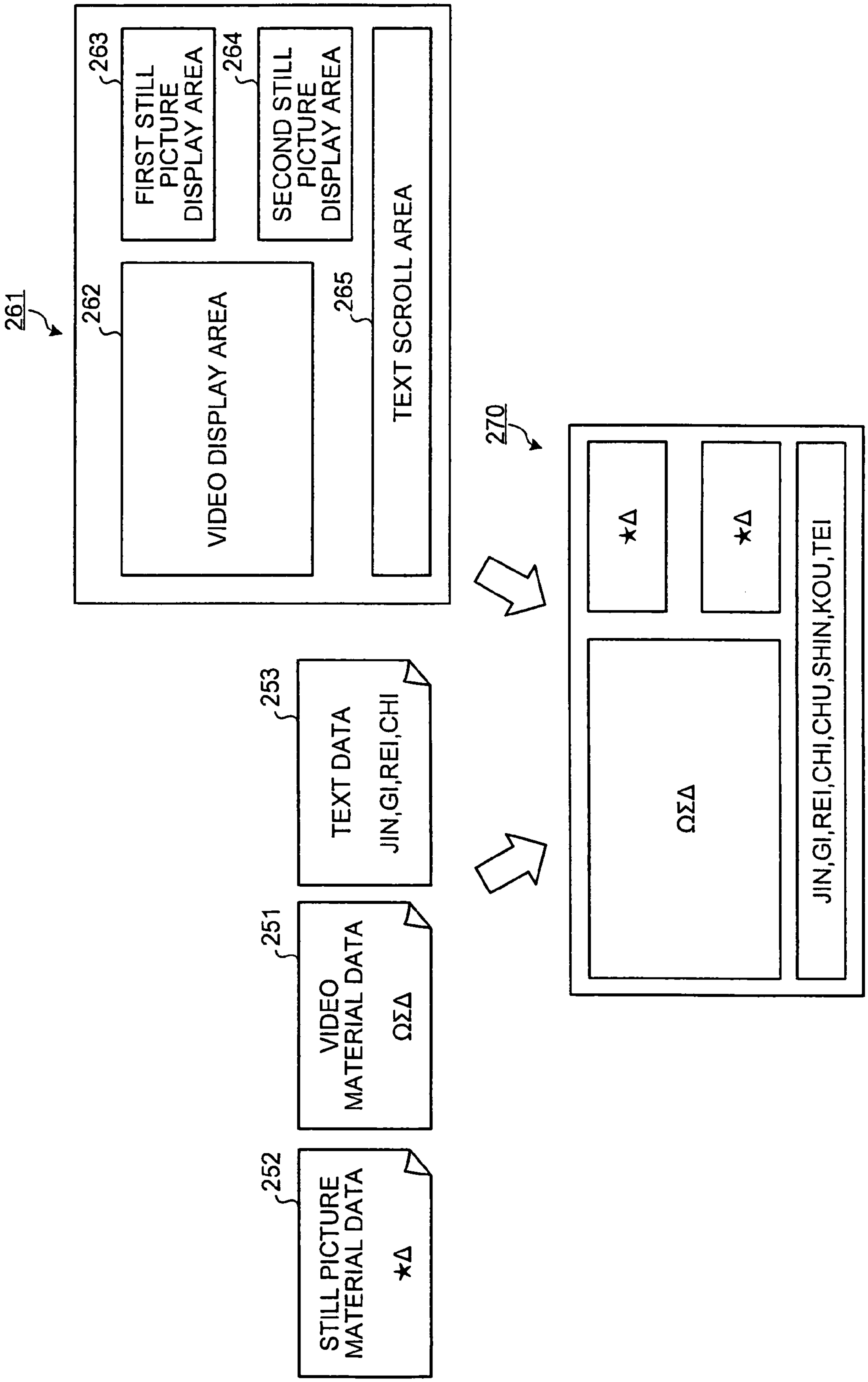
FIG. 1 is schematic diagram for explaining how a program is created by combining a template file and material data.
Figure 2:
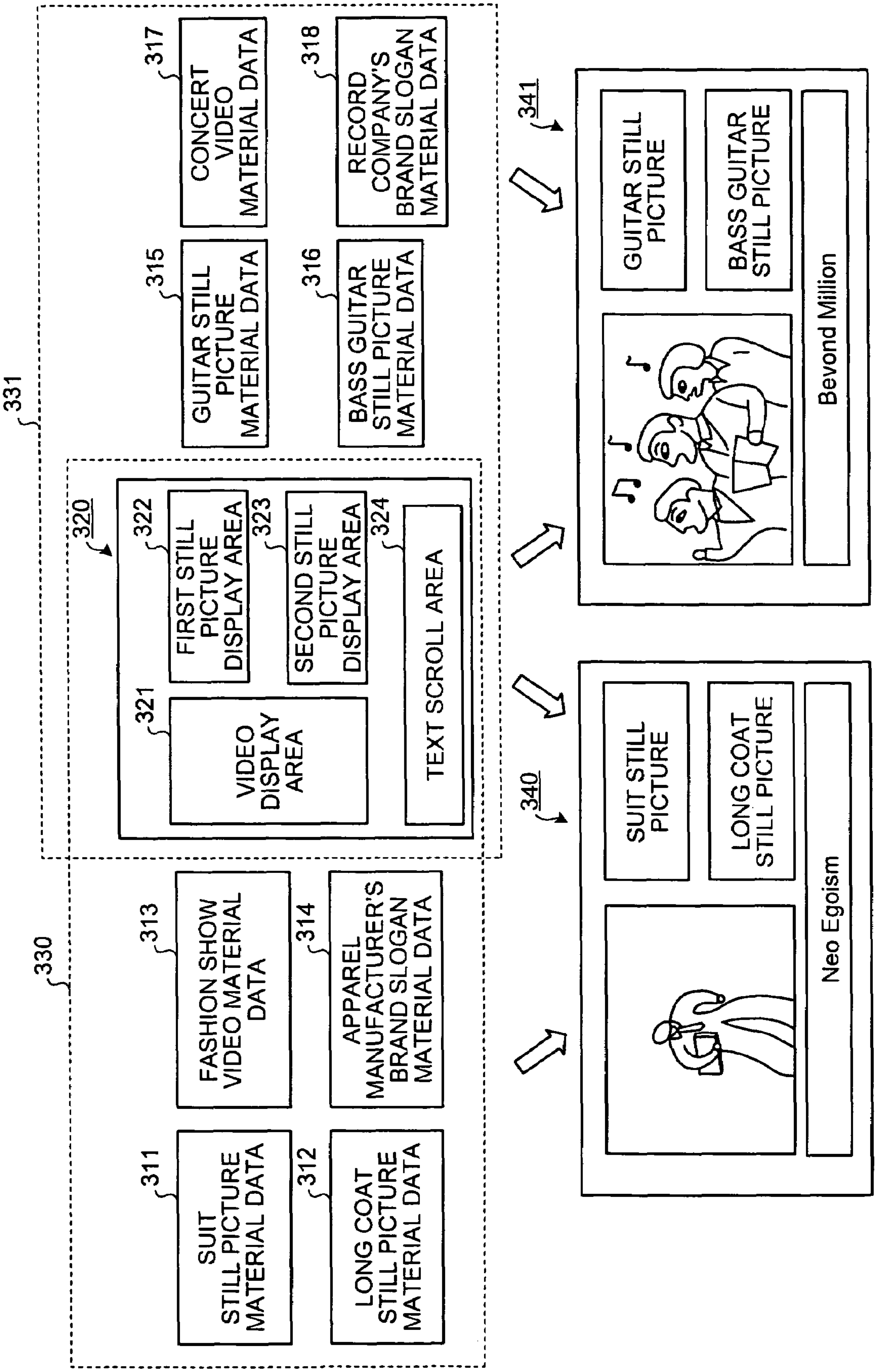
FIG. 2 is a schematic diagram for explaining how two different programs can be created by using a single template file and material data.

In particular, as shown in FIG. 1, the display screen, which includes a video display area 262, a first still picture display area 263, a second still picture display area 264, and a text scroll area 265 is defined in a template file 261. The template file defines display position information of display positions of the video display area 262, the first still picture display area 263, the second still picture display 264, the text scroll area 265 of each material data (video material data 251, still picture material data 252, and text data 253), the size of the display areas, the player used for playing the material data displayed in the different display areas (the player associated With the display area), and other relevant information. A presentation file defines a template file name, a correlation between the video material data 251 and the video display area 262, a correlation between the still picture material data and the first and second still picture display areas 263, 264, and a correlation between the text data 253 and the text scroll area 265.

During playback, the template file 261, the video material data 251, the still picture material data 252, and the text data 253 are retrieved based on the presentation file. In addition, a program 270 is created wherein each material data is played by the respective associated players in their respective display areas. In this case, the video material data 252 is played in the video display area 262, the still picture material data 251 is played in the first still picture display area 263 and 264, and the text data 253 is played in the text scroll area 265. In other words, the presentation file, the template file 261, the video material data 251, the still picture material data 252, and the text data 253 are stored, and the template file 261, the video material data 251, the still picture material data 252, and the text data 253 that are managed by the presentation file that corresponds to a single program are combined.

Thus, in the information display method according to the present invention, a plurality of material data is displayed in one or more display areas defined in a template file. The material data and the template file are managed by a presentation file. Consequently, by merely changing the presentation file, a plurality of programs can easily be created.

Further, managing one program through the presentation file, in which a plurality of material data and the template file are defined, obviates the need for processing anew the material data to create programs, which saves time.

Further, since a single program displayed by combining a plurality of material data is managed by a single presentation file, in which a plurality of material data and a template file are defined, the program can be changed by only replacing the files that need to be replaced. Consequently, the time required for transferring data can be reduced.

Since a plurality of display areas and the player for playing the material data in each display area are defined in the template file, material data that have different attributes, such as video, still picture, text, etc., can be combined and displayed in a single program.

Programs advertising a suit and a musical instrument are shown as examples. As shown in FIG. 2, a suit still picture material data 311, a long coat still picture material data 312, a fashion show video material data 313, and an apparel manufacturer's brand slogan material data 314 are provided as the material data used to create a suit advertisement program. Further, a guitar still picture material data 315, a bass guitar still picture material data 316, a concert video material data 317, and a record company's brand slogan material data 318 are provided as the material data used to create a suit advertisement program. Further, a template file 320 is provided that includes a video display area 321, a first still picture display area 322, a second still picture display area 323, and a text scroll area 324.

A first presentation file 330 defines the template file 320, a correlation between the video display area 321 and the fashion show video material data 313, a correlation between the first still picture display area 322 and the suit still picture material data 311, a correlation between the second still picture display area 323 and the long coat still picture material data 312, and a correlation between the text scroll area 324 and the apparel manufacturer's brand slogan material data 314.

A second presentation file 331 defines the template file 320, a correlation between the video display area 321 and the concert video material data 317, a correlation between the first still picture display area 322 and the guitar still picture material data 315, a correlation between the second still picture display area 323 and the bass guitar still picture material data 316, and a correlation between the text scroll area 324 and the record company's brand slogan material data 318.

If the first presentation file 330 is used, a first program 340 is created in which the fashion video material data 313 is played in the video display area 321 of the template file 320, the suit still picture material data 311 is displayed in the first still picture display area 322, the long coat still picture material data 312 is displayed in the second still picture display area 323, and the apparel manufacturer's brand slogan 314 is displayed in the text scroll area 324 by the respective associated players.

If the second presentation file 331 is used, a second program 341 is created in which the concert video material data 317 is played in the video display area 321 of the template file 320, the guitar still picture material data 315 is displayed the first still picture display area 322, the bass guitar still picture material data 316 is displayed in the second still picture display area 323, and the record company's brand slogan 318 is displayed in the text scroll area 324 by the respective associated players.

Thus, in the information display method according to the present invention, the template file 320 can be shared by two programs and different programs can easily be created by merely changing the material data defined in the presentation file.

Figure 3:
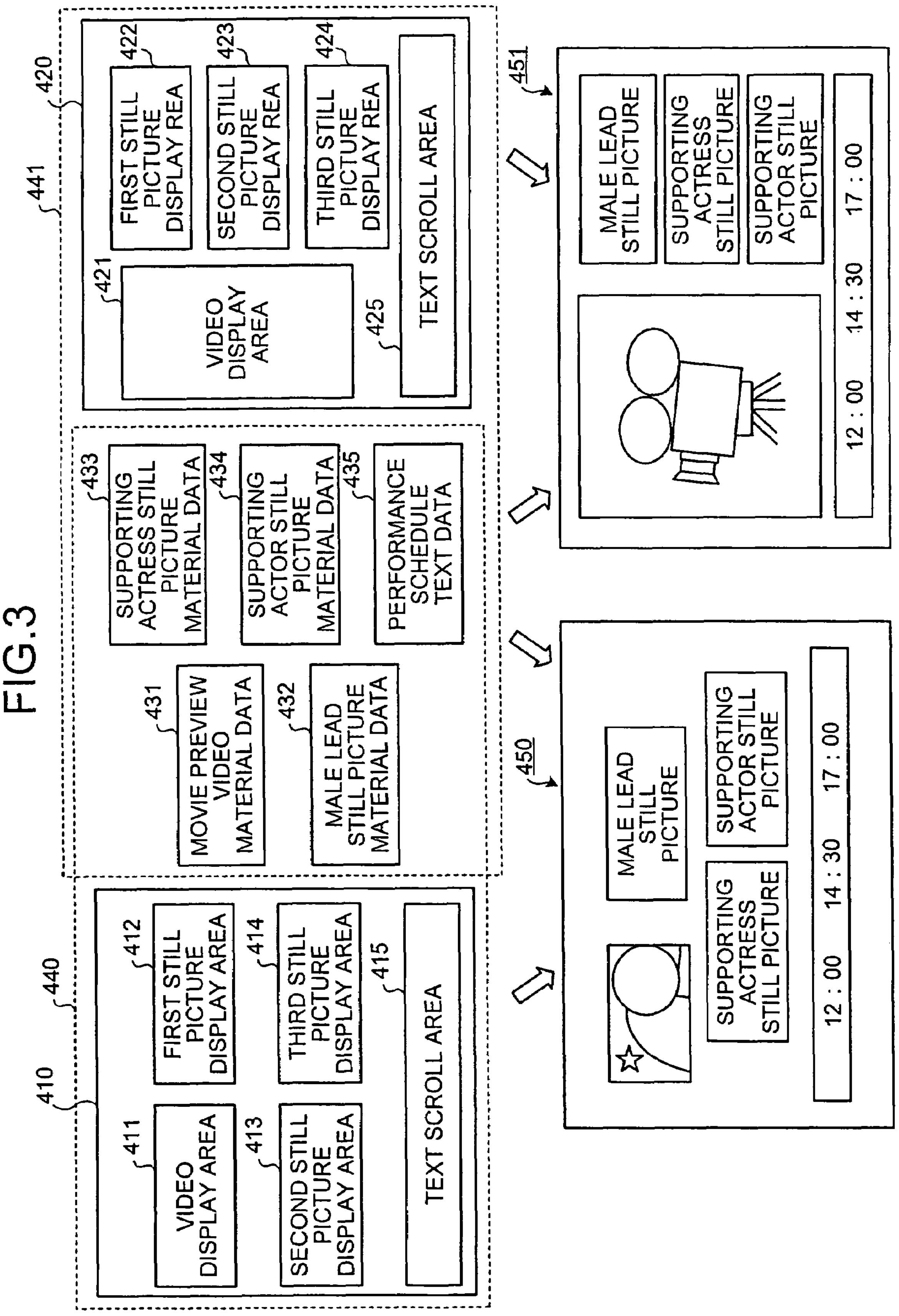
FIG. 3 is a schematic diagram for explaining how a program with two different layouts can be created by using different template files and the same material data.

Further, as shown in FIG. 3, as the material data used to create a movie advertisement program, there are provided a movie preview video material data 431, a male lead still picture material data 432, a supporting actress still picture material data 433, a supporting actor still picture material data 434, and a performance schedule text data 435. Further, a first template file 410 is provided that includes a video display area 411, a first still picture display area 412, a second still picture display area 413, a third still picture display area 414, and a text scroll area 415. A second template file 420 is also provided that similarly includes a video display area 421, a first still picture display area 422, a second still picture display area 423, a third still picture display area 424, and a text scroll area 425, but at positions and having different sizes than those in the first template file 410.

A first presentation file 440 defines the template file 410, a correlation between the video display area 411 and the movie preview video material data 431, a correlation between the first still picture display area 412 and the male lead still picture material data 432, a correlation between the second still picture display area 413 and the supporting actress still picture material data 433, a correlation between the third still picture display area 414 and the supporting actor still picture material data 434, and a correlation between the text scroll area 415 and the performance schedule text data 435.

A second presentation file 441 defines the template file 420, a correlation between the video display area 411 and the movie preview video material data 431, a correlation between the first still picture display area 412 and the male lead still picture material data 432, a correlation between the second still picture display area 413 and the supporting actress still picture material data 433, a correlation between the third still picture display area 414 and the supporting actor still picture material data 434, and a correlation between the text scroll area 324 and the performance schedule text data 435.

If the first presentation file 440 is used, a first program 450 is created in which the movie preview video material data 431 is played in the video display area 411 of the template file 410, the male lead still picture material data 432 is displayed in the first still picture display area 412, the supporting actress still picture material data 433 is displayed in the second still picture display area 423, the supporting actor still picture material data 434 is displayed in the third still picture display area 424, and the performance schedule text data 435 is displayed in the text scroll area 415 by the respective associated players.

If the second presentation file 420 is used, a second program 451 is created in which the movie preview video material data 431 is played in the video display area 411 of the template file 410, the male lead still picture material data 432 is displayed in the first still picture display area 412, the supporting actress still picture material data 433 is displayed in the second still picture display area 423, the supporting actor still picture material data 434 is displayed in the third still picture display area 424, and the performance schedule text data 435 is displayed in the text scroll area 415 by the respective associated players.

The movie advertisement program may remain displayed when using the presentation file 440 and when switching to the presentation file 441 at the time of screening the program. Accordingly, the same information can be offered to the viewer in different layouts, and in the information display method according to the present invention, the layout can be changed with great ease merely by changing the template file defined in the presentation file.

Figure 4:
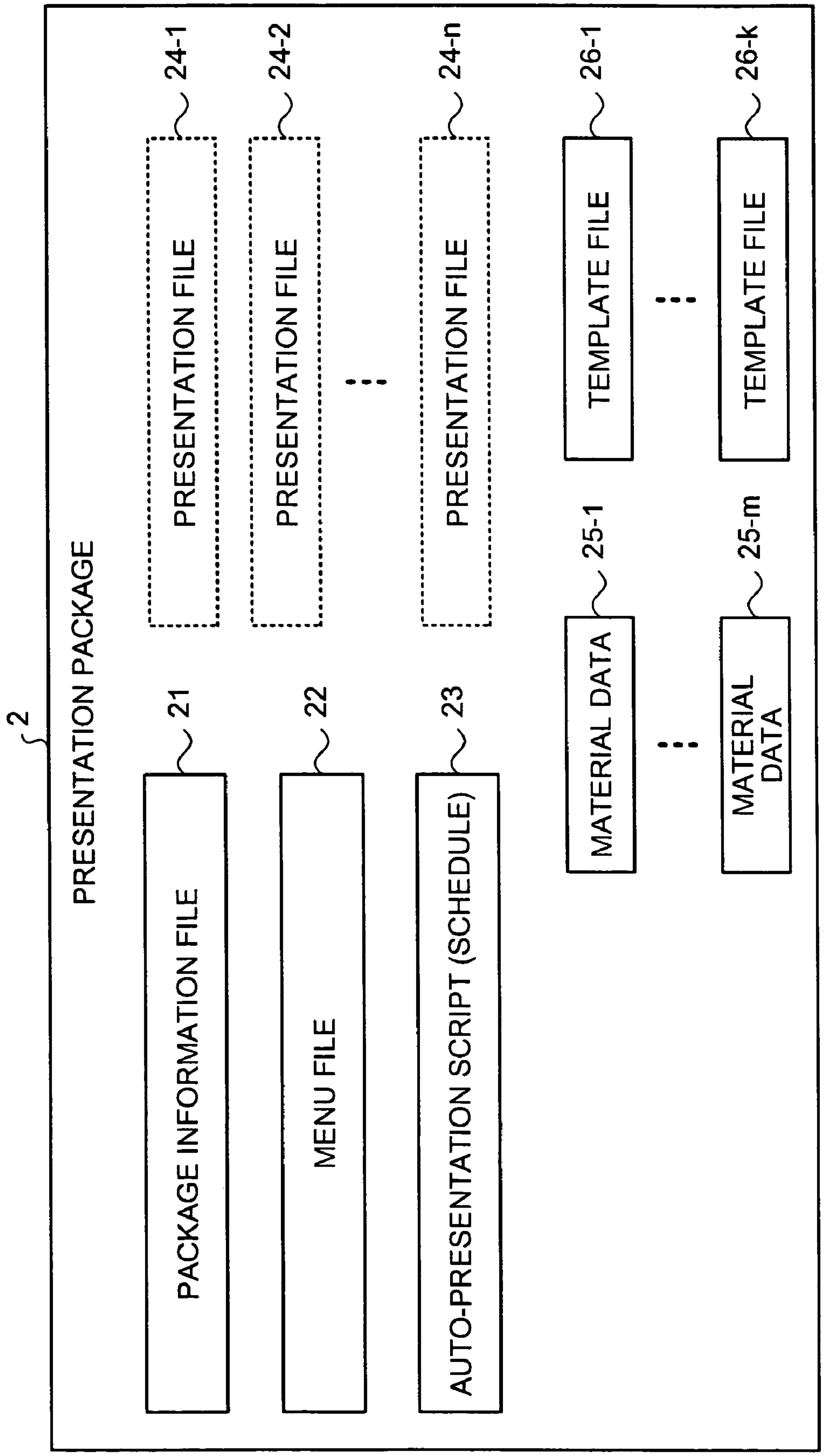
FIG. 4 is a drawing of a structure of a presentation package, which is the largest unit of files handled by an information delivery and display system according to an embodiment of the present invention.

FIG. 4 is a drawing of a structure of a presentation package 2, which is the largest unit of files handled by the information delivery and display system according to an embodiment of the present invention. The presentation package 2 includes a package information file 21, a menu file 22, an auto-presentation script 23, a plurality of presentation files 24-1 through 24-n, a plurality of material data 25-1 through 25-m, and a plurality of template files 26-1 through 26-k. The package information file 21, the menu file 22, the auto-presentation script 23, the presentation files 24-1 through 24-n, and the template files 26-1 through 26-k are the control information files that normally contain information used to display programs having a plurality of material data (contents). The material data (contents) 25-1 through 25-m are the actual display data displayed by the operations of the control information files.

The material data 25-1 through 25-m are contents data used in the template files 26-1 through 26-k. The material data 25-1 through 25-m include video image file formats such as Moving Picture Experts Group (MPEG), animation Graphic Interchange Format (animation GIF), etc., still picture file formats such as Joint Photographic Coding Experts Group (JPEG), Portable Network Graphics (PNG), Graphic Interchange Format (GIF), Tagged Image File Format (TIFF), etc., audio file formats such as Musical Instruments Digital Interface (MIDI), MPEG Audio Layer-3 (MP3), Windows (R) Media Audio (WMA), and audio-video file formats such as Flash, text files, etc.

In the template files 26-1 through 26-k are defined display position information, which indicates the display position of one or more display areas (windows) for displaying each material data, the sizes of the display areas, the player used for playing the material data in the display area, such as information pertaining to the association between each display area and the player for the display area), and other related information.

Figure 5:
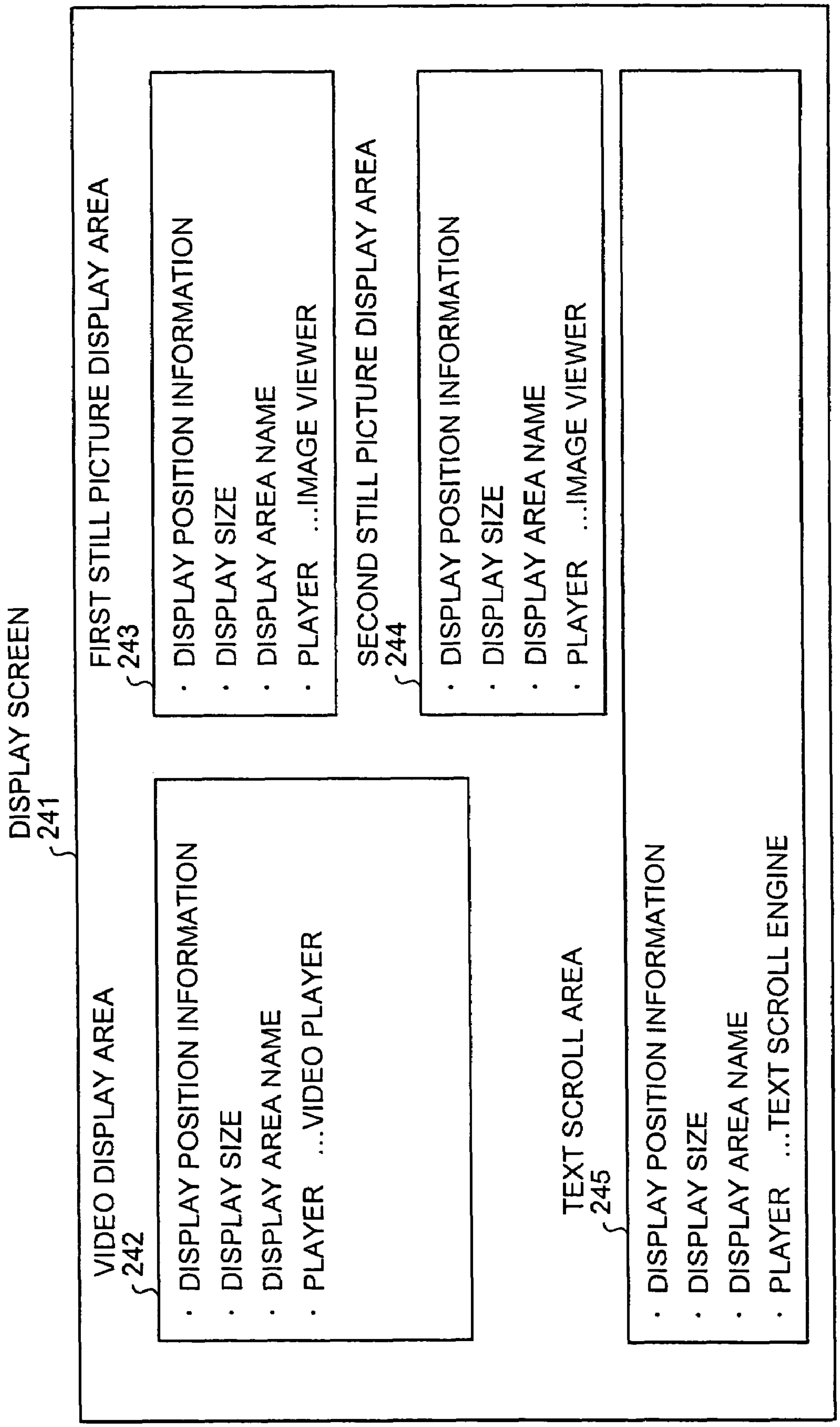
FIG. 5 is a drawing for explaining a template file shown in FIG. 4.

For example, as shown in FIG. 5, let us assume an example in which a display screen 241 displays a program that includes the following four display areas: a video display area 242 that displays MPEG files; a first still picture display area 243 that displays JPEG files; a second still picture display area 244 that displays PNG files; and a text scroll area 245 that displays text files.

The information pertaining to the video display area 242 defined in the template files includes the display position information, i.e., the display area name indicating the video display area 242, the size of the video display area 242, and the information pertaining to the association between the display area name indicating the video display area 242 and its player, which is a video player in this case.

The information pertaining to the first still picture display area 243 defined in the template files includes the display position information, i.e., the display area name indicating the first still picture display area 243, the size of the first still picture display area 243, and the information pertaining to the association between the display area name indicating the first still picture display area 243 and a player, which is an image viewer in this case.

The information pertaining to the second still picture display area 244 defined in the template files includes the display position information, i.e., the display area name indicating the second still picture display area 244, the size of the second still picture display area 244, and the information pertaining to the association between the display area name indicating the second still picture display area 244 and a player, which is also an image viewer in this case.

The information pertaining to the text scroll area 245 defined in the template files includes the display position information, i.e., the display area name indicating the text scroll area 245, the size of the text scroll area 245, and the information pertaining to the association between the text scroll area 245 and a player, which is a text scroll engine in this case.

By modifying the information defined in the template files, such as the display position of the display area, the size of the display area, and the association between the display area and the player, the layout of the display screen 241 can be easily changed. In other words, a plurality of template files having different definitions can be prepared in advance and different display layouts can be obtained depending on the template that is used. In addition, different programs can be created using the same template file merely by changing the material data to be displayed in each display area.

In each of the presentation files 24-1 through 24-n is defined a file name of one of the template files 26-1 through 26-k and the information pertaining to the correlation between one or more display areas (display area names) of the template file and one or more material data 25-1 through 25-m (file names). For example, in FIG. 5, assuming that the material data 25-1 is displayed in the video display area 242, the material data 25-2 is displayed in the first still picture display area 243, the material data 25-3 is displayed in the second still picture display area 244, and the material data 25-4 is displayed in the text scroll area, the information pertaining to these four correlations is defined in one presentation file 24-1. Thus, one presentation file corresponds to one program, and all the presentation files 24-1 through 24-n are used in the file management of the material data 25-1 through 25-m and the template files 26-1 through 26-k.

In the menu file 22 is defined information pertaining to a definition of a menu screen that includes program selection buttons by which an information viewer can select any program from the plurality of programs (i.e., the presentation files 24-1 through 24-n) and information pertaining to a correlation between each of the program selection buttons (i.e., the program selection button name) and the file name of the presentation file.

In the auto-presentation script 23 is defined the display schedule of each program, which includes information pertaining to a program start time and a program end time of each program. In other words, each presentation file name is associated with a single program start time and a single program end time.

The file names of the menu file 22 and the auto-presentation script 23 are defined in the package information file 21. The package information file 21 is used in the management of the menu file 22 and the auto-presentation script 23. The presentation files 24-1 through 24-n are managed by the menu file 22 and the auto-presentation script 23.

Figure 6:
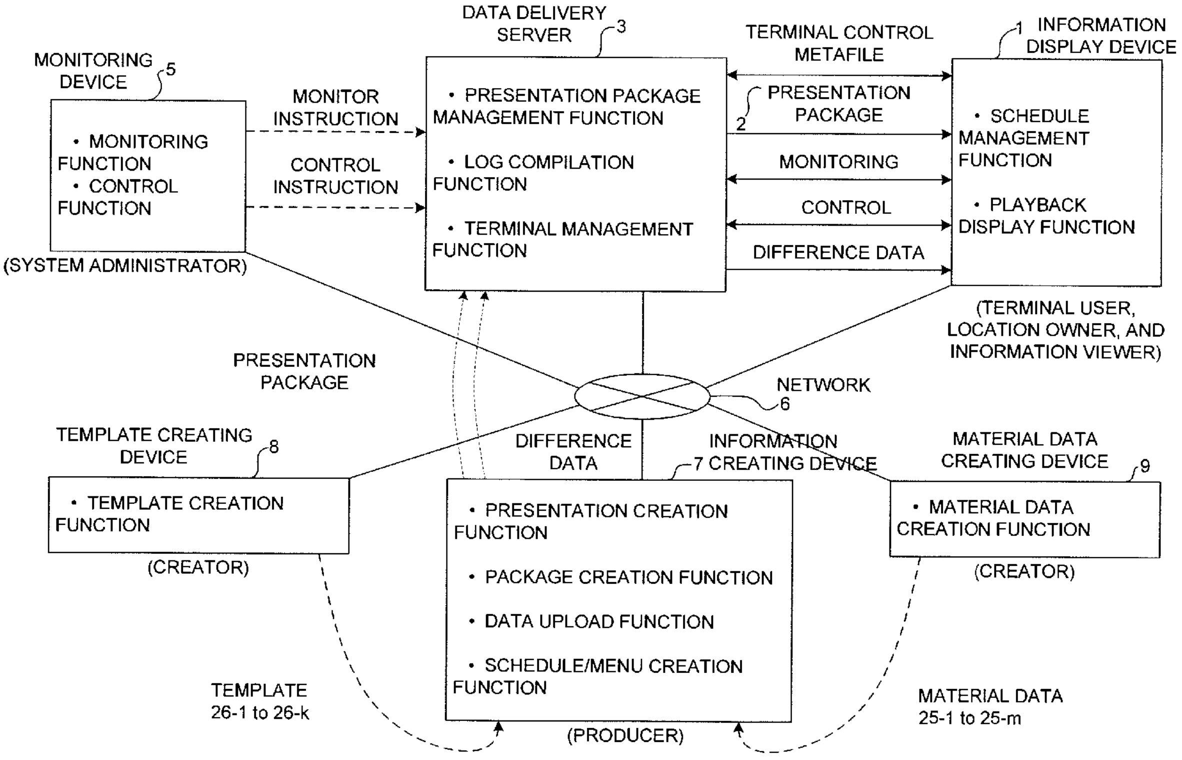
FIG. 6 is a system configuration of the information delivery and display system according to an embodiment of the present invention.

FIG. 6 is a system configuration of the information delivery and display system according to an embodiment of the present invention. The information delivery and display system includes a material data creating device 9, a template creating device 8, an information creating device 7, a data delivery server 3, a monitoring device 5, an information display device 1, and a network 6, such as the Internet, that connects all the devices to enable communication between the elements of the information delivery and display system.

The material data creating device 9 can be a personal computer or similar device on which a creator creates the material data 25-1 through 25-m and that includes the functions for creating video files, still picture files, text files, and audio-video files.

The template creating device 8 can be a personal computer or similar device on which the creator creates the template files 26-1 through 26-k and that includes the functions for creating templates.

The information creating device 7 can be a personal computer or similar device on which a producer creates programs. The information creating device 7 creates programs by creating all the files in the presentation package 2 shown in FIG. 4 using the various material data created using the material data creating device 9 and the template files created using the template creating device 8. The information creating device 7 sends the created presentation package to the data delivery server 3 via the network 6.

The information created device 7 is provided with a presentation creation function, a schedule/menu creation function, a package creation function, and a data upload function.

The presentation creation function enables the producer to create a plurality of presentation files 24-1 through 24-n, which correspond to a plurality of programs, using the material data 25-1 through 25-m created by the material data creating device 9 and template files 26-1 through 26-k created by the template creating device 8. In particular, the producer defines, for each presentation file, a file name for one template file and the correlation between the one or more display areas (display area names) and the one or more material data 25-1 through 25-m (file names) in the template file. Further, the presentation creation function displays the program by playing the material data using the template file defined in the presentation file, which enables the producer to verify the presentation file.

The schedule/menu creation function determines, based on the information pertaining to the order of priority specified by the producer for displaying the presentation files, the display schedule for the programs defined in each presentation file created using the presentation creation function and creates the auto-presentation script 23 and the menu file 22.

Whenever the menu file 22, the auto-presentation script 23, or the presentation files 24-1 through 24-n are created or modified, the package creation function creates the package information file 21 or changes the files in the package information file 21 by selecting the applicable menu file 22, auto-presentation script 23, or presentation files 24-1 through 24-n.

The data upload function sends the presentation package 2 created by the package creation function to the data delivery server 3 via the network 6. The data upload function involves creating a plurality of packages containing one or more files from the plural files in the presentation package 2 in each package, encrypting each package, tagging package identification information to the encrypted packages, and sending the encrypted and tagged packages to the data delivery server 3. The package identification information includes information such as the presentation package name to which the package belongs, and includes information pertaining to the contents of the files in the package, such as whether the files are new material data 25-1 through 25-6, modified data of material data 25-1 through 25-8, new presentation files 24-1 through 24-10, or a menu file 22.

A package represents a group of files that share the same encryption key. When creating a package, the data upload function determines whether the target presentation package 2 is new or an updated version. If assessed to be an updated version, the data upload function creates and sends packages containing only the updated files. The packages are created to reduce the amount of data transferred during a single data communication. If the data amount is not particularly large, the presentation package 2 itself may be encrypted and sent.

The data delivery server 3 carries out monitoring and control of the information display device 1 based on a monitor instruction and a control instruction from the monitoring device 5. The data delivery server 3 is provided with a presentation package management function, a terminal management function, and a log compilation function.

The presentation package management function stores the package received from the information creating device 7 and determines from the package identification information whether the received package is one of the packages of a new presentation package 2 or a package of an existing presentation package 2 containing only the updated files. If assessed to be a package containing only the updated files, the presentation package management function decrypts the stored package and the package received from the information creating device 7, updates only the to-be-updated part, which corresponds to the files in the package received from the information creating device 7, of the old presentation package 2, repacks, encrypts, and stores the updated package. If assessed to be a package of a new presentation package 2, the presentation package management function waits until all the packages are received, converts them into a new presentation package 2, and stores the new presentation package 2.

The terminal management function is explained next. When the information display device 1 accesses the system for polling, based on the monitor instruction from the monitoring device 5, the terminal management function sends to the information display device 1 information pertaining to the status of the information display device 1 such as the temperature or other relevant status (hereinafter, "monitor information") of the display unit of the information display device 1. When the information display device 1 accesses the system for polling, based on the control instruction from the monitoring device 5, the terminal management function sends to the information display device 1 a download request to download the presentation package or the package, an instruction to switch to another of the plurality of presentation packs stored in the information display device 1, or an instruction to change the settings of a polling interval to confirm the instruction to switch to another presentation package.

The log compilation function compiles and stores the monitor information received from the information display device 1. Every type of data stored by the log compilation function is available for inspection by the monitoring device 5.

The information display device 1 is a device that displays the programs created by the information creating device 7 and stores one or more presentation packs 2 obtained by decrypting packages or presentation packs 2 downloaded from the data delivery server 3. The information display device 1 is provided with a schedule management function and a playback display function.

The schedule management function manages the display schedule of the programs based on the auto-presentation script 23 of the presentation package 2. The schedule management function outputs to the playback display function a playback instruction that starts the playback and a stop instruction that stops the playback of the program. The schedule management function outputs the playback instruction either when it is the program start time defined in the auto-presentation script 23 or when the information viewer selects a program by clicking on a program selection button on a menu screen. The playback instruction includes the file name of the presentation files corresponding to the program to be played. The schedule management function outputs the stop instruction when the program is playing either when the finish time of the display specified in the auto-presentation script 23 has arrived or when the information viewer selects from the menu screen another program. The schedule management function also enables switching between the plurality of presentation packs 2 stored in the information display device 1 based on the control instruction received from the monitoring device 5 via the data delivery server 3.

The playback display function displays the program based on the presentation files included in the playback instruction. The playback display function displays the program by playing one or more material data correlated to one or more display areas of the template file defined in the presentation file by their respective associated players. For example, as shown in FIG. 1, a program 270 is created from a template file 261, in which are defined a video display area 262, still picture display areas 263 and 264, and a text scroll area 265, a video material data 251 correlated to the video display area 262, a still picture material data 252 correlated to the still picture display areas 263 and 264, and a text data 253 correlated to the text scroll area 265 is to be displayed. The program 270 has a video display area 262 in which the video material data 251 is played by the correlated video player, the still picture display areas 263 and 264 in which the still pictures 253 are played by the correlated image viewer, and the text scroll area 265 in which the text data 253 is played by the text scroll engine. If no template file is defined in the presentation file, the playback display function displays the program using a stored default template file.

The monitoring device 5 can be a personal computer that allows the system administrator to monitor and control the information display device 1 and that performs a monitoring function and a control function. The monitoring function sends to the data delivery server 3 the monitor instruction to get monitor information from the information display device. The control function sends to the data delivery server 3 the control instructions to control the information display device 1 such as a download request of the presentation package 2 or a package, an instruction to switch to another presentation package 2, an instruction to change the settings of the polling interval, or other relevant instruction.

The information delivery and display system shown in FIG. 6 shows one device each of the template creating device 8, the material data creating device 9, and the information display device 1. However, there may be a plurality of template creating devices 8, material data creating devices 9, and information display devices 1.

A brief overview of the functioning of the information delivery and display system according to the first embodiment of the present invention is explained next. The operations involved in displaying the program on the information display device 1 are explained first. The template creating device 8 sends the template files 26-1 through 26-k created by the creator to the information creating device 7. Similarly, the material data creating device 9 sends the material data 25-1 through 25-m created by the creator to the information creating device 7.

The information creating device 7 creates the files in the presentation package 2 shown in FIG. 4 using each type of the material data 25-1 through 25-m created by the material data creating device 9 and the template files 26-1 through 26-k created by the template creating device 8. The information creating device 7 sends the presentation package 2 created using the package creation function to the data delivery server 3 via the network 6.

The data delivery server 3 decrypts the received presentation package 2 or the package, encrypts it again, and stores it. The data delivery server 3 allows, the downloading of the stored presentation package 2 or package to the information display device 1 based on the control instruction from the monitoring device 5.

The information display device 1 decrypts the presentation package 2 or package downloaded from the data delivery server 3. Based on the auto-presentation script 23 or the menu file 22 in the presentation package 2, the information display device 1 plays the program by playing the material data using the template files defined in the presentation file of the program.

The operations involved in the monitoring of the information display device 1 from the monitoring device 5 are explained next. The information display device 1 accesses the data delivery server 3 for polling at predetermined time intervals. If there is a monitor instruction from the monitoring device 5 when the information display device 1 accesses the data delivery server 3, the data delivery server 3 sends a monitor information send request to the information display device 1. The information display device 1 sends the requested monitor information to the data delivery server 3. The data delivery server 3 receives and stores the monitor information and resets (clears) the monitor instruction from the monitoring device 5. In this way, the monitoring device 5 accesses the data delivery server 3 at predetermined time intervals and scans the monitor information stored in the data delivery server 3 to monitor the status of the information display device 1.

The operations involved in controlling the information display device 1 from the monitoring device 5 are explained next. The information display device 1 accesses the data delivery server 3 for polling at predetermined time intervals. If there is a control instruction from the monitoring device 5 when the information display device 1 accesses the data delivery server 3, the data delivery server 3 sends the control instruction to the information display device 1. The information display device 1 carries out the control based on the control request received from the data delivery server 3.

If the control instruction pertains to an instruction to download the presentation package 2 or the package, the information display device 1 requests the data delivery server 3 for the presentation package 2 or package specified by the control instruction and downloads it. If the control instruction pertains to an instruction to switch to another presentation package 2, the information display device 1 uses the schedule management function to switch from the current presentation package 2 to the presentation package 2 specified by the control instruction. If the control instruction pertains to an instruction to set the polling interval, the information display device 1 sets the polling interval, which becomes valid from the next time the information display device 1 accesses the data delivery server 3 for polling.

Communication is carried out through metafiles when the GET method of HTTP is used in the communication protocol during polling of the data delivery server 3 by the information display device 1. In other words, the information display device 1 accesses the data delivery server 3 at a predetermined polling interval using the GET method of the HTTP protocol. When the information display device 1 accesses the data delivery server 3, a terminal ID, which is a unique ID for every information display device 1, is tagged. When the information display device 1 accesses the data delivery server 3, the data delivery server 3 sends a terminal control metafile to the information display device 1. The terminal control metafile includes files such as instruction files that control activities such as switching between presentation packs 2. If the terminal control metafile sent by the data delivery server 3 includes a monitor instruction, the information display device 1 sends the monitor item to the data delivery server 3 in the form of a terminal information metafile. If the terminal control metafile sent by the data delivery server 3 includes an instruction to receive a terminal remote control metafile, the information display device 1 accesses the data delivery server 3 by the GET method of HTTP to receive the terminal remote control metafile. Thus, the data delivery server 3 controls the information display device 1 through metafiles. The polling interval can also be changed through the terminal remote control metafile from the data delivery server 3.

Figure 7:
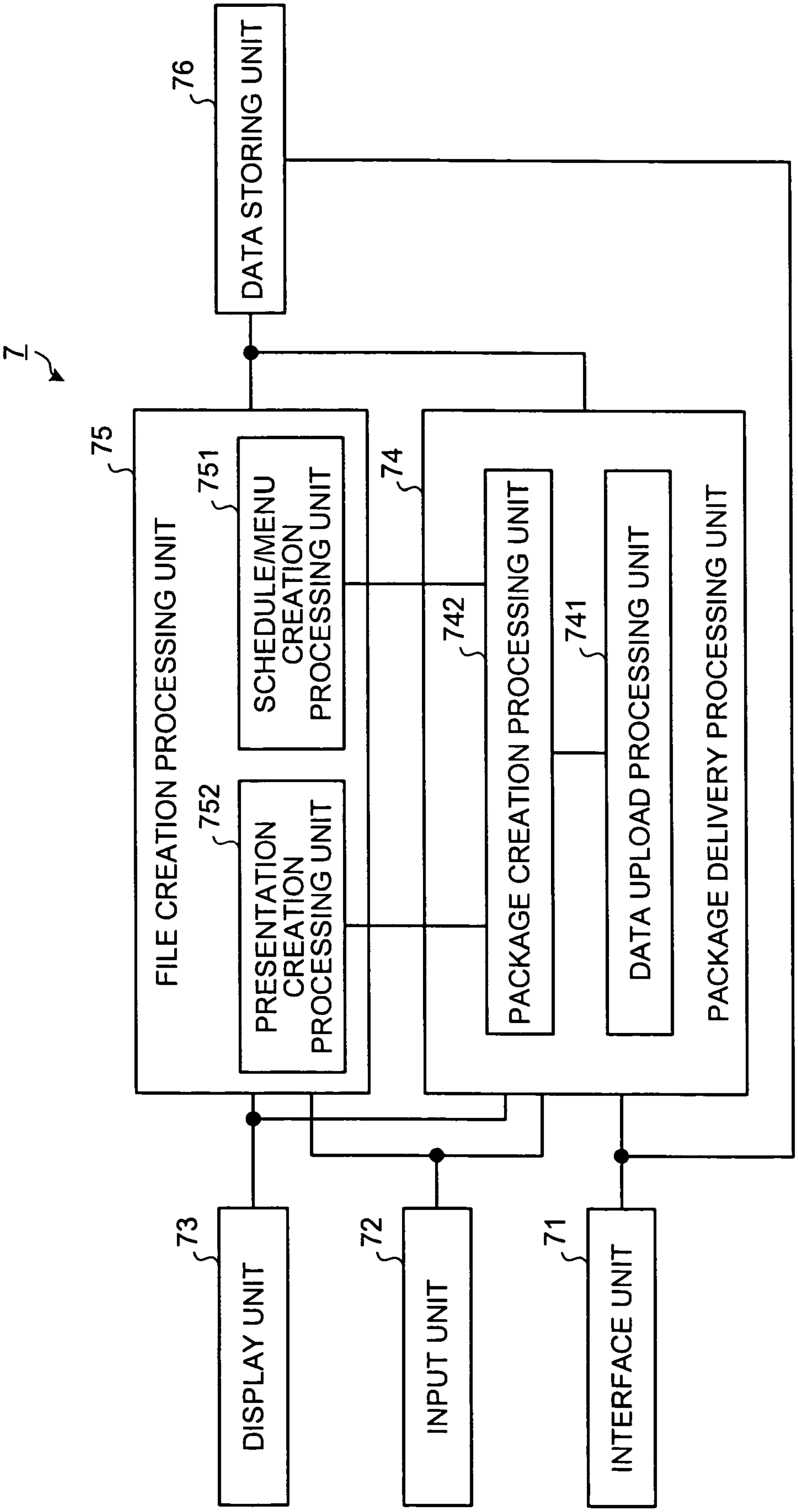
FIG. 7 is a block diagram of an information creating device shown in FIG. 6.

FIG. 7 is a block diagram of the information creating device 7 shown in FIG. 6. The information creating device 7 includes an interface unit 71, an input unit 72, a display unit 73, a package delivery processing unit 74, a file creation processing unit 75, and a data storing unit 76. The package delivery processing unit 74 includes a data upload processing unit 741 and a package creation processing unit 742. The file creation processing unit 75 includes a schedule/menu creation processing unit 751 and a presentation creation processing unit 752.

The interface unit 71 enables mutual communication among the material data creating device 9, the template creating device 8, and the data delivery server 3 via the network 6.

The input unit 72 includes a common input device such as a keyboard and a mouse and is used by the producer to create various types of files (see FIG. 2) included in the presentation package 2.

The display unit 73 can be a cathode ray tube (CRT) display, liquid crystal display (LCD), or other display device that displays the program defined by the various types of files of the presentation package 2, such as the package information file 21, the menu file 22, the auto-presentation script (schedule) file 23, the presentation files 24-1 through 24-n, the material data 25-1 through 25m, or the template files 26-1 through 26-k.

The data storing unit 76 stores the various types of files in the presentation package 2 including the various types of material data 25-1 through 25-m created by the material data creating device 9, the template files 26-1 through 26-k created by the template creating device 8, the presentation files 24-1 through 24-n created by the information creating device 7, the package information file 21, the menu file 22, and the auto-presentation script 23. The data storing unit 76 also stores a sent history of the presentation package 2 sent by the data upload processing unit 741. The sent history of the presentation package 2 includes the name of the presentation package 2, the file names and the creation date of the various types of files included in the presentation package, such as the material data 25-1 through 25-m, the template files 26-1 through 26-k, the presentation files 24-1 through 24-n, the package information file 21, the menu file 22, and the auto-presentation script 23.

The presentation creation processing unit 752 implements the presentation creation function, and creates a plurality of presentation files 24-1 through 24-n that correspond to a plurality of programs by using the material data 25-1 through 25-m created by the material data creating device 9 and the template files 26-1 through 26-k created by the template creating device 8.

The schedule/menu creation processing unit 751 implements the schedule/menu creation function and determines, based on degree of priority information, the display schedule of the presentation files created by the presentation creation processing unit 752. The degree of priority information indicates the order of priority for displaying the presentation files and is specified by the producer.

The package creation processing unit 742 implements the package creation function. When the menu file 22, the auto-presentation script 23, or any of the presentation files 24-1 through 24-n is created or modified, the package creation processing unit 742 selects the relevant menu file 22, auto-presentation script 23, or the presentation files 24-1 through 24-n and creates the package information file 21 or changes the files included in the package information file 21.

The data upload processing unit 741 implements the data upload function and delivers the presentation package 2 created by the package creation processing unit 742 to the data delivery server 3 via the network 6.

Figure 8:
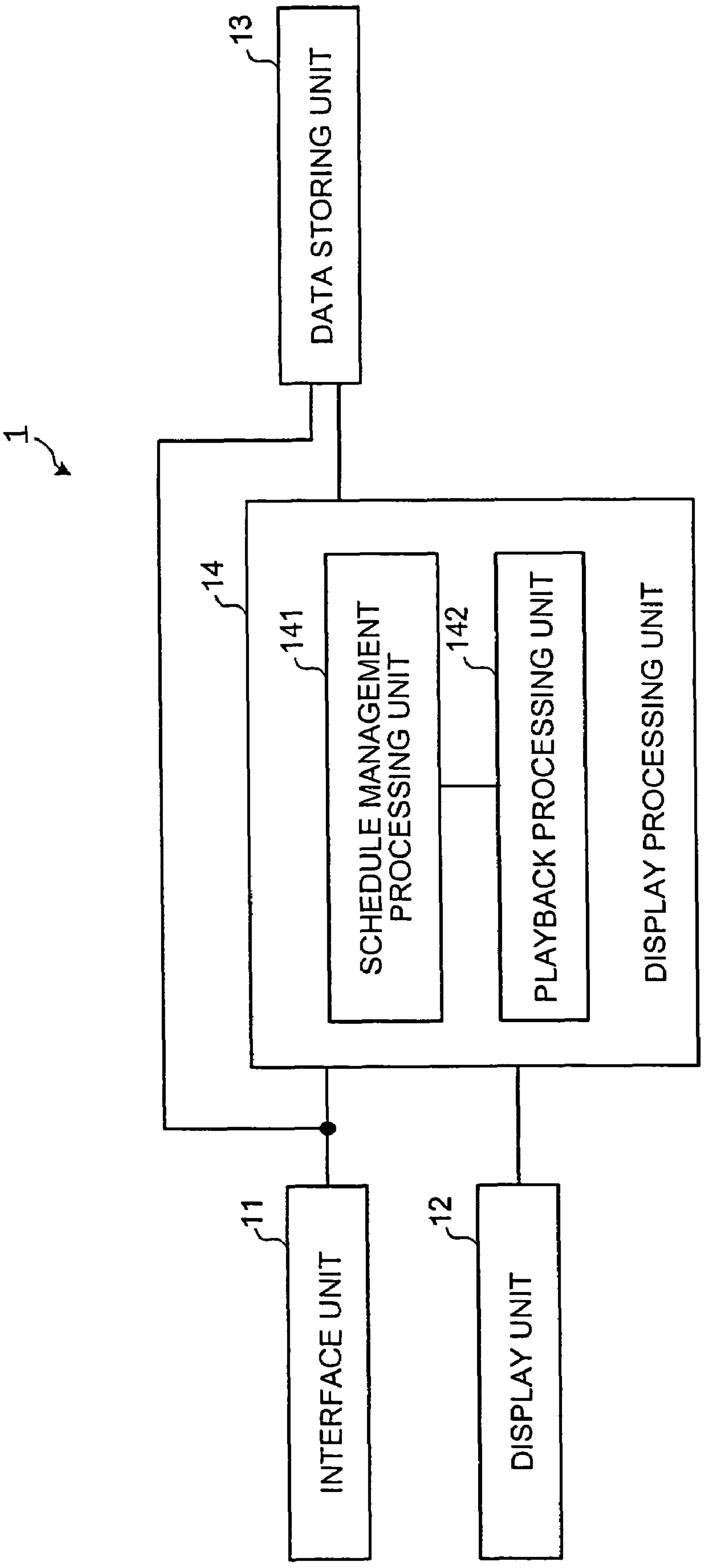
FIG. 8 is a block diagram of an information display device shown in FIG. 6.

FIG. 8 is a block diagram of the information display device 1 shown in FIG. 6. The information display device 1 includes an interface unit 11, a display unit 12, a data storing unit 13, and display processing unit 14.

The interface unit 11 provides mutual communication between the information display device 1 and the data delivery server 3 via the network 6. The data storing unit 13 stores one or more presentation packs 2 created by the information creating device 7 based on the control instruction received from the monitor device 5 via the data delivery server 3.

The display processing unit 14 includes a schedule management processing unit 141 and a playback processing unit 142. The schedule management processing unit 141 implements the schedule management function and manages the display schedule of the programs based on the auto-presentation script 23 included in the presentation package 2. When the information viewer selects any of the plurality of program selection buttons displayed by the menu file 22 on the display unit 12 or a menu screen display unit (not shown), the schedule management processing unit 141 modifies the schedule such that the presentation file corresponding to the selected program selection button is played.

The playback processing unit 142 plays one or more material data corresponding to one or more display areas included in the template file defined in the presentation file with their respective associated players and displays the program on the display unit 12.

Figure 9:
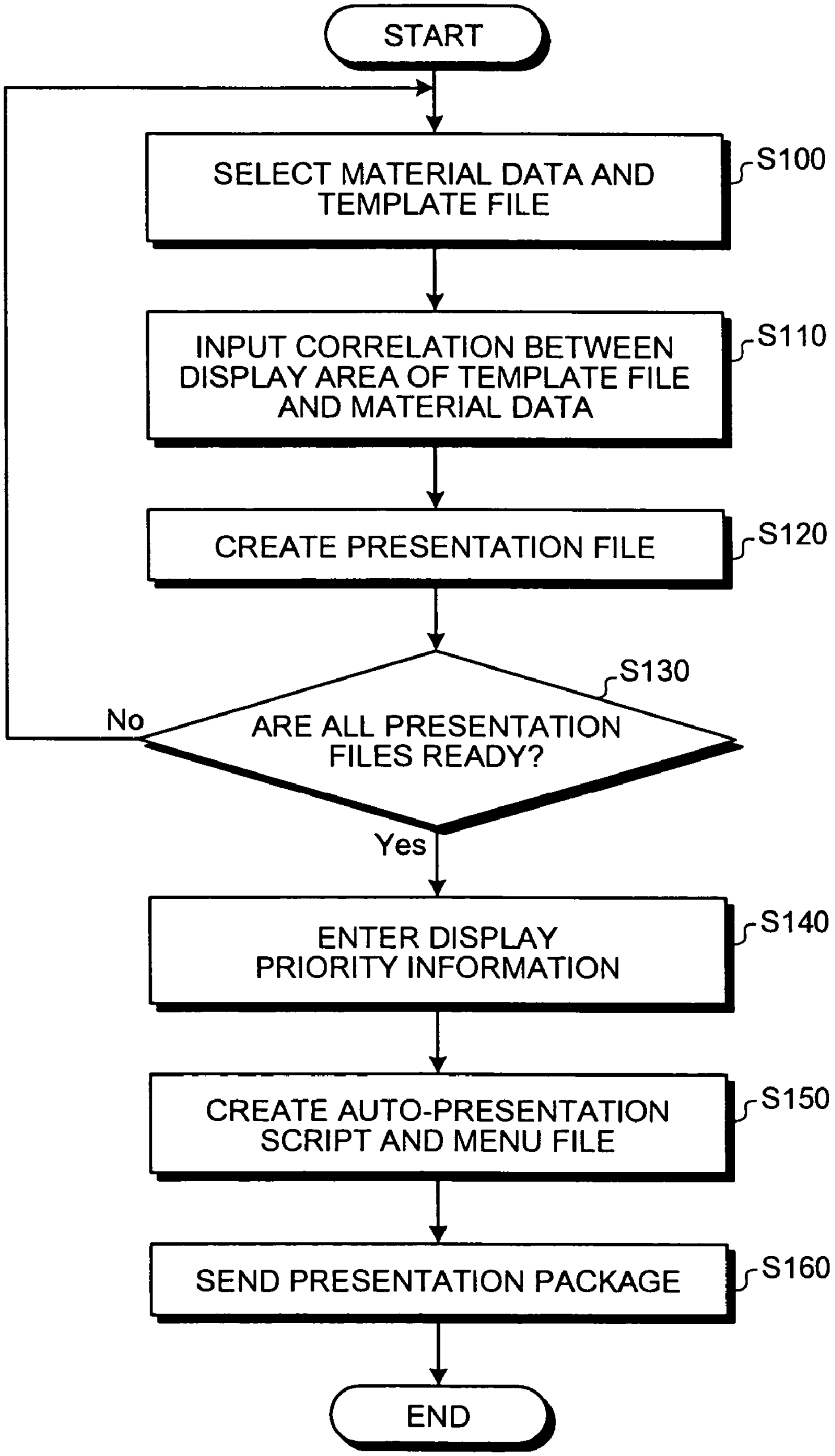
FIG. 9 is a flowchart of a process by which the information creating device creates a program.
Figure 10:
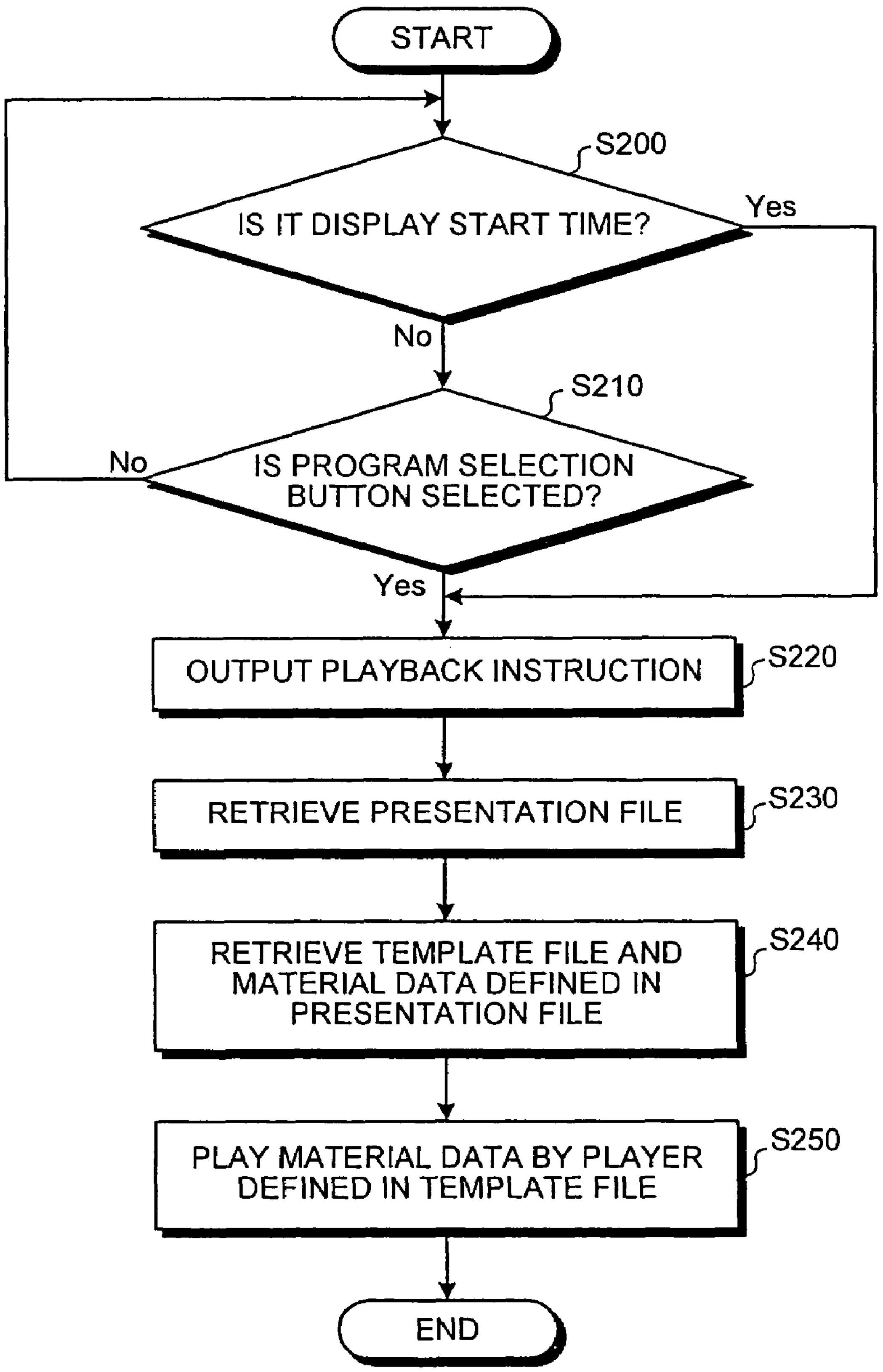
FIG. 10 is a flowchart of a process by which the information display device displays the program.

Reference is made to the flowcharts shown in FIG. 9 and FIG. 10 to explain a process by which the information creating device 7 creates a program and a process by which the information display device 1 displays the program created by the information creating device 7. FIG. 9 is a flowchart of the process by which the information creating device 7 creates a program. It is assumed here that the data storing unit 76 already stores the material data 25-1 through 25-m created by the material data creating device 9 and the template files 26-1 through 26-k created by the template creating device 8.

The producer selects from the material data 25-1 through 25-m and the template files 26-1 through 26-k (the template file and the material data corresponding to the number of display areas in the template file required for the program) and, using the input unit 72, enters the name of the selected template file and the correlation between one or more display area names of the selected template file and the file names of the material data (step S100 and S110). For example, to create the program 270 shown in FIG. 1, the producer enters the file name of the template file 261, the correlation between the video display area 262 and the video material data 251, the correlation between the first and the second still picture display areas 263 and 264 and the still picture material data 252, and the correlation between the text scroll area 265 and the text data 253.

The presentation creation processing unit 752 creates a presentation file of a predetermined format based on the file name of the template file and the correlation between one or more display areas of the template file and the file names of the material data inputted by the producer using the input unit 72 (Step S120). The producer may enable the presentation file to be immediately edited.

The presentation creation processing unit 752 repeats the process of creating a presentation file (Steps S100 through S130) every time there is an input of the file name of the template file and the correlation between one or more display areas of the template file and the file names of the material data to create one or more presentation files 24-1 through 24-n.

Once the presentation files 24-1 through 24-n used to create a program are ready, the producer enters the degree of priority information that indicates the order of priority for displaying the presentation files 24-1 through 24-n (Step S140).

The schedule/menu creation processing unit 751 determines the display schedule of the presentation files created by the presentation creation processing unit 752 based on the degree of priority information input by the producer, and creates an auto-presentation script 23 such that each presentation file name is associated with a single program start time and program end time. The schedule/menu creation processing unit 751 also creates the menu file 22 in which is defined information used to define the menu screen that includes program selection buttons for the information viewer to select one of the plurality of programs, which correspond to the plurality of presentation files 24-1 through 24-n, and the correlation information between the program selection buttons (program selection button names) and the files names of the presentation files (Step S150).

When the menu file 22, the auto-presentation script 23, or any of the presentation files 24-1 through 24-n is created or modified, the package creation processing unit 742 selects the relevant menu file 22, auto-presentation script 23, or presentation files 24-1 through 24-n and either creates the package information file 21 or changes the files included in the package information file 21 to create a new presentation package 2.

Upon receiving an instruction from the input unit 72 to upload the presentation package 2 to the data delivery server, the data upload processing unit 741 sends the presentation package 2 created by the package creation processing unit 742 to the data delivery server 3 (Step S160). In particular, the data upload processing unit 741 retrieves the sent history stored in the data storing unit 76 and searches the names of presentation packs 2 with the name of the presentation package 2 to be sent as the retrieval key. If the name of the presentation package 2 to be sent is not present among the names of the presentation package 2 in the sent history, the data upload processing unit 741 considers the presentation package 2 as a new presentation package 2 and creates a plurality of packages, with each package having one or more files included in the presentation package 2.

The data upload processing unit 741 encrypts each of the plurality of packages, tags the package identification information to the encrypted packages, and sends them to the data delivery server 3. If the name of the presentation package to be sent is present among the names of the presentation package in the sent history, then the data upload processing unit 741 compares the file names and the creation dates in the presentation package 2 with the file names and the creation dates in the sent history and retrieves the files that don't match. The data upload processing unit 741 then creates one or more packages that include the non-matching modified files, encrypts each of the packages, tags the package identification information to the encrypted packages, and sends them to the data delivery server 3. After sending the packages, the data upload processing unit 741 updates the sent history by appending the name of the sent presentation package 2 or the file names of the updated files.

The presentation package management function of the data delivery server 3 determines from the package identification information whether the package received from the information creating device 7 is one of the packages constituting a new presentation package 2 or a package of an existing presentation package 2 containing only the updated files. If assessed to be a package containing only the updated files, the presentation package management function decrypts the stored package and the package received from the information creating device 7, updates only the to-be-updated part of the old presentation package 2, which corresponds to the files in the package received from the information creating device 7, repacks, encrypts, and stores the updated package. If assessed to be a package of a new presentation package 2, the presentation package management function waits until all the packages are received, converts them into a new presentation package 2, and stores the new presentation package 2.

FIG. 10 is a flowchart of the process by which the information display device 1 displays the program created by the information creating device 7. It is assumed here that the package or the presentation package 2 downloaded from the data delivery server 3 according to the control instruction from the monitoring device 5 is stored in the data storing device 13 in the form of an encrypted presentation package 2.

The schedule management processing unit 141 is equipped with a clock function. When it is the program start time defined in the auto-presentation script stored in the data storing device 13, the schedule management processing unit 141 outputs the playback instruction that includes the name of the presentation file associated with the program start time to the playback processing unit 142 (Step S200 and Step S220). If the schedule management processing unit 141 detects a program selection button has been selected, then the schedule management processing unit 141 outputs the playback instruction that includes the name of the presentation file associated with the selected program selection button to the playback processing unit 142 (Step S200 and Step S210).

The playback processing unit 142 retrieves the presentation file included in the playback instruction issued from the data storing unit 13 (Step S230). The playback processing unit 142 also retrieves the template file and the material data defined in the retrieved presentation file from the data storing unit 13 (Step S240). The playback processing unit 142 displays the program by playing one or more material data correlated to one or more display areas of the template file defined in the presentation file with their respective associated players (Step S250). In particular, in the template file are defined the display position information that indicates the display position of one or more display areas (windows) for displaying each material data, the sizes of the display areas, and the player used for playing the material data in the display area based on information pertaining to the association between each display area and the player for the display area. The presentation file defines the information pertaining to the correlation between one or more display areas (display area names) of the template file and one or more material data. The playback processing unit 142 determines the display area in the display unit 12 based on the display position information defined in the template file and the size of the display area and plays the material data correlated with the display area in the presentation file with the aid of the associated player defined in the template file, thus combining and displaying a plurality of material data as a single program on the display unit 12.

To sum up, in the information delivery and display system according to the present embodiment, the material data creating device 9 creates the material data 25-1 through 25-m, the template creating device 8 creates the template files 26-1 through 26-k, and the information creating device 7 creates the presentation file using the material data 25-1 through 25-m and the template files 26-1 through 26-k with the template file and the material data to be used being correlated. The created presentation file is downloaded to the information display device 1 via the data delivery server 3. Using the template file and the plurality of material data correlated with the display areas in the template file defined in the presentation file, the information display device 1 creates a single program for playing each of the material data in the correlated display area by the respective associated player. In other words, the information creating device 7 delivers the presentation files, the template files, and one or more material data used to create the programs via the data delivery server 3. The information display device 1 combines and displays the material data based on the presentation files and the template files. Thus, to modify a program, only the presentation file, template file, or the material data is delivered to the information display device 1, thereby obviating the need for delivering all of the data of the program. Consequently, the amount of data to be delivered can be reduced substantially.

According to the present embodiment, the playback processing unit 142 of the information display device 1 is able to combine the material data and play them as a single program merely by mapping the template file, in which are defined the display position information that indicates the display position of one or more display areas for displaying each material data, the sizes of the display areas, and the player used for playing the material data in the display area, and by mapping the presentation file, in which is defined the information pertaining to the correlation between one or more display areas of the template file and one or more material data. Consequently, no extra processes are used during program playback.

According to the present embodiment, the template file defines the display position information that indicates the display position of one or more display areas for displaying each material data, the sizes of the display areas, and the player used for playing the material data in the display area, which corresponds to the information pertaining to the association between each display area and the player for the display area. However, the template file may also define the player for areas other than the display areas, such as the background, and the material data as the background for the presentation file. Thus, the appeal of a program can be further enhanced by displaying in the background an image that is contextually relevant, such as to suit a season, place where the program is viewed, the gender and age of the viewer, etc.

According to the present embodiment, the information creating device 7 creates the presentation package 2. However, the material data creating device 9 and the template creating device 8 may respectively send the material data and the template files directly to the data delivery server 3. In this case, the information creating device 7 may only send the package information file 21, the menu file 22, the auto-presentation script 23, and the presentation files 24-1 through 24-n to the data delivery server 3, and the data delivery server 3 may create the presentation package 2 that includes the template files 26-1 through 26-k defined in the presentation files 24-1 through 24-n and the material data 25-1 through 25-m.

The material data creating device 9 and the template creating device 8 may also respectively send the material data and the template files directly to the information display device 1. In this case, the information creating device 7 may only send the package information file 21, the menu file 22, the auto-presentation script 23, and the presentation files 24-1 through 24-n to the data delivery server 3, and the information display device 1 may download only these files. This process enables flexibility in selective modification of the material data and the template file even if the material data and the template files are created by a plurality of creators, which reduces the time for creating a program.

In the present embodiment, a name of the template file is defined in the presentation file. However, it is possible to define only the association between each of the display areas of the template file and the material data in the presentation file. In this case, a default template file may be stored in the data storing unit 13 of the information display device, and the playback processing unit 142 may retrieve the default template file when no name of the template file is defined in the presentation file.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A program display method, comprising:
- providing mutual communication between a program display apparatus and a data delivery server via a network;
- creating the program by generating at least one presentation file that makes up the program based on a template file, material data, display areas, players, and a correlation;
  - wherein generating the at least one presentation file comprises:
    - selecting the material data and the template file based on selection information that is input by a user;
      - wherein the material data and the template file are to be used in the program to be displayed and the template file defines:
        - display areas; and
        - a player that is to show and play the material data in each display area; and
    - determining a correlation between the material data and the display areas based on correlation information that is input by the user;
- receiving priority information that indicates which presentation file is to be preferentially displayed from among the at least one presentation file;
  - wherein the priority information is input by the user;
- defining a auto-presentation script based on the degree of priority information input by the user;
- generating a presentation package that defines the program;
  - wherein the presentation package includes a menu file, the auto-presentation script, one or more material data, one or more template files defining one or more display areas for displaying each material data, and one or more presentation files defining information pertaining to the correlation between the one or more display areas of the one or more template files and the one or more material data;
- storing, into a data storing unit, the presentation package downloaded from the data delivery server; and
- displaying the program based on the presentation package;
  - wherein displaying the program based on the presentation package comprises:
    - managing a display schedule of the one or more presentation files based on the auto-presentation script, and modifying the display schedule such that the presentation file corresponding to a program selection button is played when selected by an information viewer from a plurality of program selection buttons displayed by the menu file;
    - retrieving each of the one or more presentation files based on the auto-presentation script; and
    - playing, with their respective associated players, the material data correlated to the one or more display areas of the template file defined in the presentation file.

2. The program display method according to claim 1, further comprising:
- making available one or more template files; and
- creating a presentation file for each template file,
- wherein a layout of a display screen is changed by selecting each of the presentation files.

3. The program display method according to claim 2, wherein the presentation file created for each template file stores only a name of the respective template file and an association between each of the display areas of the template file and the material data.

4. The program display method according to claim 1, wherein information corresponding to the display areas defined by the template file comprises:

display position information indicating a position where the material data is to be shown on a display; and display size information indicating a size of the material data to be shown on the display.

5. A program display system, comprising:

an interface unit that provides mutual communication between a program display apparatus and a data delivery server via a network;

a program creating unit that creates a program by generating at least one presentation file that makes up the program based on a template file, material data, display areas, players, and a correlation;

wherein generating the at least one presentation file comprises:

a selecting unit that selects the material data and the template file based on selection information that is input by a user;

wherein the material data and the template file are to be used in the program to be displayed and the template file defines:

display areas; and a player that is to show and play the material data in each display area; and a correlating unit that correlates between the material data and the display areas based on correlation information that is input by the user;

a receiving unit that receives priority information that indicates which presentation file is to be preferentially displayed from among the at least one presentation file;

wherein the priority information is input by the user;

a schedule management processing unit that defines a auto-presentation script based on the degree of priority information input by the user;

a presentation package generating unit that generates a presentation package that defines the program;

wherein the presentation package includes a menu file, the auto-presentation script, one or more material data, one or more template files defining one or more display areas for displaying each material data, and one or more presentation files defining information pertaining to the correlation between the one or more display areas of the one or more template files and the one or more material data;

a data storing unit that stores the presentation package downloaded from the data delivery server; and a plurality of displaying units that display the program based on the presentation package;

wherein the displaying units comprise:

a schedule processing unit that manages a display schedule of the one or more presentation files based on the auto-presentation script, and modifies the display schedule such that the presentation file corresponding to a program selection button is played when a information viewer selects any of a plurality of program selection buttons displayed by the menu file; and a playback processing unit that retrieves each of the one or more presentation files based on the auto-presentation script and plays, with their respective associated players, the material data correlated to the one or more display areas of the template file defined in the presentation file.

6. The program display apparatus according to claim 5, wherein information corresponding to the display areas defined by the template file comprises:

display position information indicating a position where the material data is to be shown on a display; and display size information indicating a size of the material data to be shown on the display.

7. A program delivery and display system, comprising:

an interface unit that provides mutual communication between a program display device and a data delivery server via a network;

a program creating device that includes:

a program creating unit that creates a program by generating at least one presentation file that makes up the program based on a template file, material data, display areas, players, and a correlation;

wherein generating the at least one presentation file comprises:

a selecting unit that selects the material data and the template file based on selection information that is input by a user;

wherein the material data and the template file are to be used in the program to be displayed and the template file defines:

display areas; and a player that is to show and play the material data in each display area; and a correlating unit that correlates between the material data and the display areas based on correlation information that is input by the user;

a receiving unit that receives priority information that indicates which presentation file is to be preferentially displayed from among the at least one presentation file;

wherein the priority information is input by the user;

a schedule management processing unit that defines a auto-presentation script based on the degree of priority information input by the user;

a presentation package generating unit that generates a presentation package that defines the program;

wherein the presentation package includes a menu file, the auto-presentation script, one or more material data, one or more template files defining one or more display areas for displaying each material data, and one or more presentation files defining information pertaining to the correlation between the one or more display areas of the one or more template files and the one or more material data;

a sending unit that sends the presentation package; and the program display device that includes:

a receiving unit that receives the presentation package;

a data storing unit that stores the presentation package downloaded from the data delivery server; and a displaying unit that displays the program based on the received presentation package;

wherein the displaying unit comprises:

a schedule processing unit that manages a display schedule of the one or more presentation files based on the auto-presentation script, and modifies the display schedule such that the presentation file corresponding to a program selection button is played when a information viewer selects any of a plurality of program selection buttons displayed by the menu file; and a playback processing unit that retrieves each of the one or more presentation files based on the auto-presentation script and plays, with their respective associated players, the material data correlated to the one or more display areas of the template file defined in the presentation file.

8. The program delivery and display system according to claim 7, wherein information corresponding to the display areas defined by the template file comprises:

display position information indicating a position where the material data is to be shown on a display; and display size information indicating a size of the material data to be shown on the display.

* * * * *